(12) United States Patent
Guerin et al.

(10) Patent No.: US 6,369,153 B1
(45) Date of Patent: Apr. 9, 2002

(54) WATER-REDISPERSIBLE PULVERULENT COMPOSITION OF FILM-FORMING POLYMERS PREPARED FROM ETHYLENICALLY UNSATURATED MONOMERS

(75) Inventors: Gilles Guerin, Eaubonne; Mikel Morvan, Courbevoie, both of (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/631,333

(22) Filed: Aug. 3, 2000

Related U.S. Application Data

(63) Continuation of application No. 09/051,737, filed as application No. PCT/FR96/01639 on Oct. 21, 1996, now abandoned.

(30) Foreign Application Priority Data

Oct. 25, 1995 (FR) .............................. 95 12588

(51) Int. Cl.⁷ ............... C08K 5/09; C08L 9/00
(52) U.S. Cl. ............ 524/523; 524/524; 524/563; 523/334

(58) Field of Search ............. 523/334; 524/563, 524/523, 524

(56) References Cited

U.S. PATENT DOCUMENTS 4,968,350 A * 11/1990 Bindschaedler et al. .... 523/334

* cited by examiner

*Primary Examiner*—James J. Seidleck
*Assistant Examiner*—Olga Asinovsky
(74) *Attorney, Agent, or Firm*—John A. Shedden

(57) ABSTRACT

The present invention relates to a water-redispersible pulverulent composition obtained by a mixing and then drying an emulsion of at least one water-insoluble film-forming polymer, at least one main surfactant and at least one water-soluble compound, comprising a) an emulsion of at least one water-insoluble film-forming polymer prepared from ethylenically unsaturated monomers, b) at least one main surfactant whose water/surfactant binary phase diagram contains an isotropic phase which is fluid at 25° C. up to a concentration of at least 50% by weight of surfactant, followed by a hexagonal or cubic type rigid liquid crystal phase at higher concentrations which is stable at least up to the drying temperature, and c) at least one water-soluble compound. The invention relates, in addition, to a process for preparing such a composition and to its use.

9 Claims, No Drawings

WATER-REDISPERSIBLE PULVERULENT COMPOSITION OF FILM-FORMING POLYMERS PREPARED FROM ETHYLENICALLY UNSATURATED MONOMERS

This application is a continuation application of Ser. No.: 09/051,737, filed on Jul. 24, 1998, now abandoned which is a 371 of PCT/FR96/01639 filed Oct. 21, 1998.

The present invention relates to water-redispersible powders of film-forming polymers prepared from ethylenically unsaturated monomers, to a process for preparing them and to their use.

Redispersible powders obtained by spraying and drying dispersions of acrylic film-forming polymers, and especially dispersions of polymers of vinyl esters, are already known.

Film-forming polymers prepared from ethylenically unsaturated monomers are frequently used as adjuvants in inorganic hydraulic binding compositions to improve their use and their properties after hardening, such as adhesion to various substrates, leaktightness, flexibility and mechanical properties.

Redispersible powders have the advantage, compared to aqueous dispersions, that they can be premixed with cement in the form of ready-to-use pulverulent compositions which are usable, for example, for the manufacture of mortars and concretes intended for affixing to building materials, or for the manufacture of adhesive mortars or for the production of protective and decorative coatings for the inside or outside of buildings.

To achieve success in obtaining powders that do not agglomerate during storage through the effect of pressure and temperature and which are satisfactorily redispersible in water, it is customary to add relatively large amounts of inert substances and of protective colloids to them.

Thus, it has already been proposed to add to the dispersions, before spraying, melanine/formaldehyde/sulphonate (U.S. Pat. No. 3,784,648) or naphthalene/formaldehyde/sulphonate (DE-A-3143070) condensation products and/or vinylpyrrolidone/vinyl acetate copolymers (EP-078449).

French Patent FR-A-2,245,723 relates to a stable and water-dispersible preparation dried by freezing, containing a powder of a polymer latex and a water-soluble dispersing agent which is a saccharide.

The object of the present invention is to provide a new pulverulent composition which is completely or almost completely redispersible in water, based on a film-forming polymer prepared from ethylenically unsaturated monomers.

Another object of the present invention is to provide a redispersible powder of the above type which is stable on storage without agglomeration.

Another object of the present invention is to provide a process for preparing the powders of the above type from latices of film-forming polymer.

Another object of the present invention is to provide a redispersible powder of the above type which, in powder form or after redispersion, where appropriate, in water in the form-of a pseudolatex, is usable in all the fields of application of latices to produce coatings (in particular paints, paper coating composition) or adhesive compositions (in particular pressure-sensitive adhesives, tile adhesives).

Another object of the present invention is to provide a redispersible powder of the above type (or the pseudolatex derived therefrom) for the purpose, more especially, of use as additives to hydraulic binders of the mortar or concrete type.

These and other objects are achieved by the present invention which relates, in effect, to a water-redispersible pulverulent composition obtained by mixing and then drying an emulsion of at least one water-insoluble film-forming polymer, at least one main surfactant and at least one water-soluble compound, comprising:
   an emulsion of at least one water-insoluble film-forming polymer prepared from ethylenically unsaturated monomers,
   at least one main surfactant whose water/surfactant binary phase diagram contains an isotropic phase which is fluid at 25° C. up to a concentration of at least 50% by weight of surfactant, followed by a hexagonal or cubic type rigid liquid crystal phase at higher concentrations which is stable at least up to the drying temperature,
   at least one water-soluble compound.

The subject of the invention in, in addition, a process for preparing such a pulverulent composition, consisting in:
   removing the water from an aqueous emulsion consisting of a water-insoluble film-forming polymer prepared by aqueous emilsion polymerization and containing at least one main surfactant, at least one water-soluble compound and, where appropriate, at least one additional surfactant or one anti-caking agent,
   and spraying the dry residue to a powder of desired particle size.

The composition according to the invention has the advantage of redispersing spontaneously in water, to give an emilsion again having a particle size close to that of the initial emulsion.

Other advantages and features of the invention will become more clearly apparent on reading the description and the examples which follow.

The invention relates, in the first place, to a water-redispersible pulverulent composition obtained by mixing and then drying an emulsion of at least one water-insoluble film-forming polymer, at least one main surfactant and at least one water-soluble compound, comprising:
   an emulsion of at least one water-insoluble film-forming polymer prepared from ethylenically unsaturated monomers,
   at least one main surfactant whose water/surfactant binary phase diagram contains an isotropic phase which is fluid at 25° C. up to a concentration of at least 50% by weight of surfactant, followed by a hexagonal or cubic type rigid liquid crystal phase at higher concentrations which is stable at least up to the drying temperature,
   at least one water-soluble compound.

The water-insoluble film-forming polymers are prepared from ethylenically unsaturated monomers, in particular of the vinyl and/or acrylate type.

The water-insoluble film-forming polymers are preferably vinyl or acrylate homopolymers or vinyl acetate, styrene/butadiene, styrene/acrylate, acrylate and styrene/butadiene/acrylate copolymers.

The film-forming polymers preferably have a glass transition temperature of between approximately −20° C. and +50° C., preferably between 0° C. and 40° C. These polymers may be prepared in a manner known per se, by emulsion polymerization of ethylenically unsaturated monomers using polymerization initiators and in the presence of standard emulsifying and/or dispersing agents. The content of polymer in the emulsion generally lies between 30 and 70% by weight, and more specifically between 35 and 65% by weight.

As monomers, there may be mentioned vinyl esters, and more especially vinyl acetate; alkyl acrylates and methacrylates in which the alkyl group contains from 1 to 10 carbon atoms, for example methyl, ethyl, n-butyl and 2-ethylhexyl acrylates and methacrylates; and vinylaromatic monomers, especially styrene. These monomers may be copolyserized with one another or with other ethylenically unsaturated monomers.

As non-limiting examples of monomers which can be copolymerized with vinyl acetate and/or acrylic esters and/or styrene, there may be mentioned ethylene and olefins such as isobutene; the vinyl esters of saturated, branched or unbranched monocarboxylic acids having from 1 to 12 carbon atoms, such as vinyl propionate, "Versatate" (registered trade mark for the esters of branched $C_9$-$C_{11}$ acids), pivaloate and laurate; the esters of unsaturated mono- or dicarboxylic acids possessing 3 to 6 carbon atoms with alkanols possessing 1 to 10 carbon atoms, such as methyl, ethyl, butyl and ethylhexyl maleates and fumarates; vinylaromatic monomers such as methylstyrenes and vinyltoluenes; vinyl halides such as vinyl chloride and vinylidene chloride, and diolefins, especially butadiene.

The emulsion polymerization of the monomers is carried out in the presence of an emulsifier and a polymerization initiator.

The monomers employed may be introduced as a mixture or separately and simultaneously into the reaction medium, either all at once before the beginning of the polymerization, or during the polymerization in successive fractions or in continuous fashion.

As emulsifying agent, the traditional anionic agents are generally employed, represented, in particular, by fatty acid salts, alkyl sulphates, alkylsulphonates, alkylaryl sulphates, alkylarylsulphonates, aryl sulphates, arylsulphonates, sulphosuccinates, alkyl phosphates of alkali metals and abietic acid salts, hydrogenated or otherwise. They are employed in the proportions 0.01 to 5% by weight relative to the total weight of the monomers.

The emulsion polymerization initiator, which is water-soluble, is represented more especially by hydroperoxides such as hydrogen peroxide, cumene hydroperoxide, diisopropylbenzene hydroperoxide and paramenthane hydroperoxide, and by persulphates such as sodium persulphate, potassium porsulphate and amonium persulphate. It is employed in amounts between 0.05 and 2% by weight relative to the total weight of the monomers. These initiators are optionally used in combination with a reducing agent such as sodium bisulphite or sodium formaldehydebisulphite, polyethylenamines, sugars, namely dextrose or sucrose, and metal salts. The amounts of reducing agent used vary from 0 to 3% by weight relative to the total weight of the monomers.

The reaction temperature, which is dependent on the initiator employed, is generally between 0 and 100° C., and preferably between 30 and 70° C.

It is possible to use a transfer agent in proportions ranging from 0 to 3% by weight relative to the monomer(s), generally chosen from morcaptans such as N-dodecyl morcaptan and tert-dodecyl morcaptan; cyclohexene; and halogenated hydrocarbons such as chloroform, bromoform and carbon tetrachloride. It enables the proportion of grafted polymer and the length of the grafted molecular chains to be adjusted. It is added to the reaction medium either before the polymerization or during polymerization.

According to a preferred embodiment of the invention, the film-forming polymer of the composition according to the invention has a surface which is only slightly carboxylated, and hence a low level of surface acidity.

Thus, it preferably has a level of surface acidity of not more than 100 microequivalents of —COOH functions per gram of polymer, preferably not more than 50 microequivalents of —COOH functions per gram of polymer.

The composition according to the invention comprises, in addition, at least one main surfactant whose water/surfactant binary phase diagram contains an isotropic phase which is fluid at 25° C. up to a concentration of at least 50% by weight of surfactant, followed by a hexagonal or cubic type rigid liquid crystal phase at higher concentrations which is stable at least up to the drying temperature.

The description of these-phases is given in the work by R. G. Laughlin entitled "The AQUEOUS PRASE BEHAVIOUR OF SURFACTANTS" —Academic Press—1994. Their identification by radiation diffraction (X-ray and neutron) is described in the work by V. Luzzati entitled "BIOLOGICAL MEMBRANES, PHYSICAL FACT AND FUNCTION" —Academic Press—1968.

More especially, the rigid liquid crystal phase of the main surfactant is stable up to a temperature equal to at least 60° C. According to a preferred embodiment of the invention, the rigid liquid crystal phase is stable up to a temperature equal to at least 55° C.

It may be pointed out here that the fluid isotropic phase may be poured, while the rigid liquid crystal phase cannot.

The main surfactant may be of the nonionic or ionic type. According to a particular embodiment of the invention, the said main surfactant in ionic.

According to a first preferred embodiment of the invention, main surfactants having a binary phase diagram as described above and chosen from ionic glycolipid surfactants are employed.

Among ionic glycolipid surfactants, uronic acid derivatives are used more especially.

The uronic acids corresponding to the following general formula represent an especially advantageous embodiment of the invention:

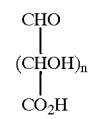

with n representing an integer varying from 1 to 4.

Examples of compounds of this type are, in particular, galacturonic, glucuronic, D-mannuronic, L-iduronic and L-guluronic acids, without, however, being limited to these acids.

The hydrocarbon chain of the surfactant, which may be substituted or unsubstituted, is a saturated or unsaturated chain containing from 6 to 24 carbon atoms, and preferably from 8 to 16 carbon atoms.

Compounds derived from galacturonic and glucuronic acids may be employed more especially. The description of these products as well as a process for preparing them are described, in particular, in Patent Application EP 532,370.

According to a preferred embodiment of the invention, galacturonic acid derivatives in salt form are used as main surfactants.

More especially, the hydroxyl group borne by the carbon linked to the oxygen in the ring is replaced by a group OR in which R represents a linear or branched alkyl radical having from 9 to 22 carbon atoms.

Moreover, the counterion of the salt of the said surfactant is an alkali metal, an alkaline-earth metal or alternatively a quaternary ammonium group in which the radicals linked to the nitrogen atom, which may be identical or different, are chosen from hydrogen and an alkyl or hydroxyalkyl radical possessing 1 to 6 carbon atoms.

According to a second preferred embodiment of the present invention, an amphoteric type main surfactant is employed.

Appropriate amphoteric surfactants for carrying out the invention have, more especially, the following general formula:

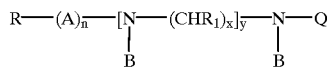

in which formula R represents an alkyl or alkenyl radical comprising 7 to 22 carbon atoms, $R_1$ represents a hydrogen atom or an alkyl radical comprising 1 to 6 carbon atoms, A represents a (CO) or ($OCH_2CH_2$) group, n equals 0 or 1, x equals 2 or 3, y equals 0 to 4, Q represents a radical $—R_2—COO\ N$ with $R_2$ representing an alkyl radical comprising 1 to 6 carbon atoms, M represents H, Na, K or $NH_4$ and B represents N or Q.

According to a particular embodiment, surfactants of this type comprising at least two carboxyl groups are used. Thus, more especially, B represents the radical Q.

The acid function of these compounds may, with equal effect, be present partially or completely in acid form or in salified form.

Among these surfactants corresponding to the above formula, amphoteric derivatives of alkylpolyamines, such as Amphionic XL® and Mirataine H2C-HA® marketed by Rhône-Poulenc, as well as Ampholac 7T/X® and Ampholac 7C/X® marketed by Berol Nobel, are employed more especially.

The main surfactants which have just been described may be used alone. However, the use of several surfactants belonging or otherwise to the same category would not constitute a departure from the scope of the present invention.

The pulverulent composition according to the invention comprises, in addition, at least one water-soluble compound. More especially, this compound is a solid.

The water-soluble compounds may be chosen, in particular, from inorganic species such as alkali metal or alkaline-earth metal silicates and alkali metal or alkaline-earth metal phosphates such as sodium hexametaphosphate.

The most advantageous silicates in this type of application are those having an $SiO_2/M_2O$ mole ratio of between 1.6 and 3.5, with M representing a sodium or potassium atom.

The water-soluble compounds may likewise be chosen from organic species such as urea, sugars and their derivatives.

Among sugars and their derivatives, monosaccharides (or glycoses), glycosides and strongly depolymerized polyholosides may be mentioned. The compounds in question are understood to be ones whose weight average molecular mass is, more especially, less than 20,000 g/mol.

Aldoses such as glucose, mannose, galactose and ketoses such as fructose are example of appropriate monosaccharides for the present invention.

Glycosides are compounds which result from the condensation, with elimination of water, of monosaccharide molecules with one another, or alternatively of monosaccharide molecules with non-carbohydrate molecules. Among glycosides, preference as given to holosides, which are formed by the linking of exclusively carbohydrate units, and more especially oligoholosides (or oligosaccharides), which contain only a limited number of these units, that is to say a number in general below 10. As examples of oligoholosides, sucrose, lactose, cellobiose and maltose may be mentioned.

Appropriate polyholosides (or polysaccharides), that is to say strongly depolymerized compounds whose weight average molecular masses are, more especially, less than 20,000 g/mol, are described, for example, in the work by P. Arnaud entitled "cours de chimie organique" [Course in organic chemistry], published by Gauthier-Villars, 1987. As a non-limiting example of strongly depolymerized polyholosides, dextran, starch, xanthan gum and galact nans such as guar or carob may be mentioned. These polysaccharides preferably have a melting point above 100° C. and a solubility in water of between 50 and 500 g/l.

Polyelectrolytes of an organic nature, originating from the polymerization of monomers which have the following general formula:

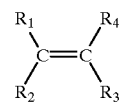

in which formula the radicals $R_i$, which may be identical or different, represent H, $CH_3$, $CO_2H$ or $(CH_2)_n—CO_2H$ with n=0 to 4, are also suitable.

As non-limiting examples of compounds of this type, acrylic, methacrylic, maleic, fumaric, itaconic and crotonic acids may be mentioned.

The copolymers obtained from the monomers corresponding to the above general formula and those obtained using these monomers and other monomers, especially vinyl derivatives such as vinyl alcohols and vinyl amides such as vinylpyrrolidone, are also suitable for the invention. There may also be mentioned the copolymers obtained from alkyl vinyl ether and maleic acid, as well as those obtained from vinylstyrene and maleic acid which are described, in particular, in the Kirk-Othmer encyclopedia entitled "ENCYCLOPEDIA OF CHEMICAL TECHNOLOGY" —Volume 18 —3rd edition—Wiley insterscience publication—1982.

The peptide polymers derived from the polycondensation of amino acids, in particular of aspartic and glutamic acids, or from precursors of the diamino diacids, are also suitable for the invention. These polymers may be either homopolymers derived from aspartic or glutamic acid, or copolymers derived from aspartic acid and glutamic acid in any proportions, or copolymers derived from aspartic and/or glutamic acid and other amino acids. Among amino acids which can be copolymerized, glycine, alanine, leucine, isoleucine, phenylalanine, methionine, histidine, proline, lysine, serine, threonine, cysteine, etc., may be mentioned.

Preferred polyelectrolytes have a low degree of polymerization. The weight average molecular masses of these macromolecules are, more especially, less than 20,000 g/mol, and preferably between 1000 and 5000 g/mol.

Naturally, it is entirely possible to envisage the use of these different types of water-soluble compounds in combination.

According to another variant of the invention, the water-soluble compound is a main surfactant.

The composition of the present invention can contain, in addition, at least one additional ionic surfactant.

The additional ionic surfactants can be, more especially, anphoteric surfactants such as alkylbetaines, alkyldimethylbetaines, alkylamidopropylbetaines, alkylamidopropyldimethylbetaines, alkyltrimethylsulphobetaines, imidazoline derivatives such as alkylamphoacetates, alkylamphodiacetates, alkylamphopropionates, alkylamphodipropionates, alkylsultaines or alkylamidopropylhydroxysultaines, and the condensation products of fatty acids and protein hydrolysates.

It is likewise possible to use additional anionic surfactants such as the water-soluble salts of alkyl sulphates and of alkyl ether sulphates, alkylisethionates and alkyltaurides or their salts, alkyl carboxylates, alkyl sulphosuccinates or alkyl succinamates, alkylsarcosinates, the alkyl derivatives of protein hydrolysates, acylaspartates and alkyl and/or alkyl ether and/or alkyl aryl ether phosphate esters. The cation is, in general, an alkali metal or alkaline-earth metal, such as sodium, potassium, lithium or magnesium, or an ammonium group $NR_4^+$ with the radicals R, which may be identical or different, representing an alkyl radical substituted or otherwise with an oxygen or nitrogen atom.

It is possible to add any standard additive, depending on the field of application of the compositions, to the redispersible pulverulent compositions according to the invention.

In the pulverulent compositions according to the invention, the content of powder of film-forming polymer is advantageously between 40 and 90 parts by weight in the pulverulent composition. According to a particular embodiment of the invention, the content of powder of film-forming polymer is at least 50 parts, preferably at least 70 parts, by weight.

The amount of main surfactant is, in general, between 1 and 20 parts by weight in the pulverulent composition. Preferably, this content is between 2 and 10 parts by weight.

The amount of water-soluble compound is, in general, between 7 and 50 parts by weight in the pulverulent composition. According to a preferred variant, this amount is between 8 and 25 parts by weight.

The weight ratio of the concentrations between the main surfactant and the water-soluble compound is, in general, between 20:80 and 90:10.

If they are identical, that is to say if the pulverulent composition according to the invention comprises at least one main surfactant that also plays the part of water-soluble compound, the total amount of this compound naturally corresponds to the sum of the two ranges mentioned above.

In the case where the pulverulent composition of the invention comprises an additional surfactant, the weight ratio of the concentrations between the main surfactant and the additional surfactant is, in general, between 5 and 10.

The composition according to the invention can comprise, in addition, at least one mineral filler having a particle size of less than 10 $\mu$m approximately, preferably less than 3 $\mu$m.

As mineral filler, it is recommend to use a filler chosen, in particular, from calcium carbonate, kaolin, barium sulphate, titanium oxide, talc, hydrated alumina, bentonite and calcium sulphoaluminate (satin white), and silica.

The presence of the mineral fillers favours the preparation of the powder and its stability on storage by preventing aggregation of the powder, that is to say caking thereof.

This mineral filler may be added directly to the pulverulent composition, where it may arise from the process for preparing the composition. The amount of mineral filler can be between 0.5 and 40, preferably from 2 to 20, parts by weight per 100 parts of powder of water-insoluble film-forming polymer.

The pulverulent compositions obtained are stable on storage; they may be readily redispersed in water in the form of a pseudolatex, and used directly in powder form or in the form of a pseudolatex in all known fields of application of latices.

The process for preparing the pulverulent composition will now be described.

As stated above, the process consists in:
removing the water from an aqueous emulsion consisting of a water-insoluble film-forming polymer prepared by aqueous emulsion polymerization and containing at least one main surfactant, at least one water-soluble compound and, where appropriate, at least one additional surfactant or one anti-caking agent,
spraying the dry residue to a powder of desired particle size.

Naturally, in the case where standard additives are used, they may be added during the formation of the emulsion.

The process starts from an aqueous emulsion of the powder of water-insoluble film-forming polymer, obtained by emulsion polymerization as defined above. This type of emulsion is commonly referred to as a latex.

To this aqueous emulsion are added the other components of the pulverulent composition: main surfactant, water-soluble compound, where appropriate the additional surfactant and/or the anti-caking agent. The respective contents of the various constituents are chosen such that the dry pulverulent compositions have the composition defined previously. Preferably, the process starts from an emulsion having a dry extract (film-forming polymer + main surfactant + water-soluble compound + additional surfactant + anti-caking agent) of between 10 and 70% by weight, still more preferably between 40 and 60%.

The water of this emulsion is then removed and the product obtained sprayed in order to obtain a powder. The steps of removal of water from the latex emulsion and of obtaining a powder may be separate or concomitant. Thus, it is possible to use a process of freezing, followed by a step of sublimation, or of lyophilization, of drying or of drying by atomization (spray-drying).

Drying by atomization is the preferred process, since it enables the powder having the desired particle size to be obtained directly without necessarily including the step of grinding. The particle size of the powder is generally less than 500 $\mu$m.

The drying by atomization may be performed in the customary manner in any known apparatus, such as, for example, an atomization tower combining spraying, effected by means of a nozzle or a centrifugal impeller, with a stream of hot gas.

The inflow temperature of the hot gas (generally air) at the head of the column is preferably between 100 and 115° C., and the outflow temperature is preferably between 55 and 65° C.

The mineral filler may be added to the aqueous emulsion of starting polymer. All or part of the mineral filler may also be introduced during the spraying step in the process of drying by atomization. Lastly, it is possible to add the mineral filler directly to the final pulverulent composition.

In the majority of cases, the pulverulent compositions according to the invention are completely redispersible in water at room temperature by simple agitation. Completely redispersible is understood to refer to a powder according to the invention which, after the addition of a suitable amount of water, enablos a pseudolatex to be obtained whose particle size is substantially identical to the size of the latex particles present in the starting emulsion.

The invention also relates to the pseudolatex obtained by redispersion in water of a pulverulent composition as defined above.

Lastly, the invention relates to the use of the pulverulent compositions described above in the building industry as additives to mixtures of inorganic hydraulic binders for the production of protective and decorative coatings, adhesive mortars and adhesive cements intended for affixing tiles and floor coverings. They prove especially useful for the preparation of ready-to-use powdered products based on cement and also on plaster.

The pulverulent compositions of the invention, or the pseudolatices derived therefrom, are usable, in addition, in all the other fields of application of latices, more especially in the field of adhesives, of paper coating and of paints. The pulverulent compositions according to the invention can contain, in addition, standard additives, especially biocides, microbiostats, bacteriostatics and silicone and organic antifoamx.

The examples which follow illustrate the invention without, however, limiting its scope.

EXAMPLES

Example 1

The following emulsion is prepared in a blender:

| Composition | weight % |
| --- | --- |
| styrene/butadiene latex (*) | 80 |
| sodium (decyl D-galactosid)uronate (**) | 10 |
| water | 10 |

1 kg of this emulsion is atomized under the standard conditions of a NIRO® type atomization column (115° C. at entry and 60° C. at exit). The emulsion is coatomized in the presence of a dispersion of kaolin such that the amount of kaolin in the final product is 12% by weight. The final product takes the form of a pourable powder composed of more or less spherical particles having the following characteristics:

the size of the particles is between 10 and 100 µm,
the dry extract of the powder in 99%,
the weight composition of the dry powder is as follows:

| styrene/butadiene latex | 70% |
| --- | --- |
| sodium (decyl D-galactosid)uronate | 17% |
| kaolin | 12% |
| water | 1% |

The atomized product redisperses spontaneously in water at room temperature. The average size of the particles of the emulsion obtained, measured using a Brookhaven® granulometer, is 0.13 µm.

Example 2

The following emulsion is prepared in a blender:

| Composition | Weight % |
| --- | --- |
| styrene/butadiene latex | 77.5 |
| alkyl polyaminocarboxylate (*) | 22.5 |

This latex is the same as in Example 1.

The mixture is atomized using a BUCHI® device with an entry temperature of 110° C. and an exit temperature of 70° C.

The powder obtained after atomization displays spontaneous dispersion in water. The pseudolatex obtained has a particle size identical to that of the starting latex.

Example 3

The following emulsion is prepared in a blender:

| Composition | weight % |
| --- | --- |
| styrene/butadiene latex | 80 |
| sodium (decyl D-galactosid)uronate | 2 |
| lactose | 8 |
| water | 10 |

The latex is the same as in Example 1.

This mixture is atomized using a BUCHI® device with an entry temperature of 110° C. and an exit temperature of 70° C.

The powder obtained after atomization displays spontaneous dispersion in water. The pseudolatex obtained has a particle size identical to that of the starting latex.

Example 4

The following emulsion is prepared in a blender:

| Composition | Weight % |
| --- | --- |
| styrene/butadiene latex | 82 |
| sodium (decyl D-galactosid)uronate | 2 |
| urea | 2 |
| sodium silicate | 14 |

The latex is the same as in Example 1.

The sodium silicate has an $SiO_2/Na_2O$ ratio equal to 2. It is in solution in water (dry extract equal to 45% by weight).

The sodium silicate is mixed first with the sodium (decyl D-galactosid)uronate and the urea, and the mixture is then added to the styrene/butadione latex, enabling a fluid dispersion to be obtained.

This mixture is then atomized using a BUCHI® device with an entry temperature of 110° C. and an exit temperature of 70° C.

The powder obtained after atomization displays spontaneous dispersion in water. The psoeudolatex obtained has a particle size identical to that of the starting latex.

Example 5

The following emulsion is prepared in a blender:

| Composition | Weight % |
| --- | --- |
| styrene/butadiene latex | 80 |
| sodium (decyl D-galactosid)uronate | 2 |
| urea | 2 |
| sodium hexametaphosphate | 6 |
| water | 10 |

The latex is the same as in Example 1.

The sodium hexametaphosphate is mixed first with the sodium (decyl D-galactosid)uronate and the urea, and this mixture is then added to the styrene/butadiene latex.

This mixture is atomized using a BUCHI® device with an entry temperature of 110° C. and an exit temperature of 70° C.

The powder obtained after atomization displays spontaneous dispersion in water. The pseudolatex obtained has a particle size identical to that of the starting latex.

What is claimed is:

1. A pulverulent composition obtained by mixing and then drying an emulsion, comprising:

an emulsion of at least one water-insoluble film-forming polymer prepared from ethylenically unsaturated monomers, at least one main surfactant whose water/surfactant binary phase diagram contains an isotropic phase which is fluid at 25° C. up to a concentration of at least 50% by weight of surfactant, followed by a hexagonal or cubic type rigid liquid crystal phase at higher concentrations which is stable at least up to the drying temperature, and at least one water-soluble compound, wherein the main surfactant is an amphoteric surfactant of the following general formula:

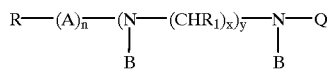

wherein R represents an alkyl or alkenyl radical comprising 7 to 22 carbon atoms, $R_1$ represents a hydrogen atom or an alkyl radical comprising 1 to 6 carbon atoms, A represents a (CO) or ($OCH_2CH_2$) group, n equals 0 or 1, x equals 2 or 3, y equals 0 to 4, Q represents a radical —$R_2$—COO M with $R_2$ representing an alkyl radical comprising 1 to 6 carbon atoms, M represents H, Na, K or $NH_4$ and B represents H or Q.

2. A pulverulent composition according to claim 1, wherein the main surfactant comprises at least two carboxyl groups.

3. A pulverulent composition obtained by mixing and then drying an emulsion, comprising:

an emulsion of at least one water-insoluble film-forming polymer prepared from ethylenically unsaturated monomers, at least one main surfactant whose water/surfactant binary phase diagram contains an isotropic phase which is fluid at 25° C. up to a concentration of at least 50% by weight of surfactant, followed by a hexagonal or cubic type rigid liquid crystal phase at higher concentrations which is stable at least up to the drying temperature, and at least one water-soluble compound, wherein the water-soluble compound is a polyelectrolyte of an organic nature originating from the polymerization of monomers which have the following general formula:

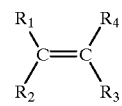

wherein the radicals $R_i$, which may be identical or different, represent H, $CH_3$, $CO_2H$ or $(CH_2)_n$—$CO_2H$ with n=0 to 4.

4. A pulverulent composition according to claim 1, wherein the water-soluble compound is an alkali metal silicate, an alkaline-earth metal silicate, an alkali metal phosphate, an alkaline-earth metal phosphate, urea or sugar.

5. A pulverulent composition according to claim 3, wherein the wherein the main surfactant is an amphoteric surfactant of the following general formula:

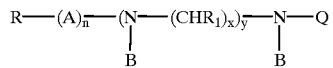

wherein R represents an alkyl or alkenyl radical comprising 7 to 22 carbon atoms, $R_1$ represents a hydrogen atom or an alkyl radical comprising 1 to 6 carbon atoms, A represents a (CO) or ($OCH_2CH_2$) group, n equals 0 or 1, x equals 2 or 3, y equals 0 to 4, Q represents a radical —$R_2$—COO M with $R_2$ representing an alkyl radical comprising 1 to 6 carbon atoms, M represents H, Na, K or $NH_4$ and B represents H or Q.

6. A pulverulent composition according to claim 1, wherein the content of water-insoluble film-forming polymer is between 40 and 90 parts by weight, the amount of main surfactant is between 1 and 20 parts by weight, and the amount of water-soluble compound is between 7 and 50 parts by weight in the pulverulent composition.

7. A pulverulent composition according to claim 3, wherein the content of water-insoluble film-forming polymer is between 40 and 90 parts by weight, the amount of main surfactant is between 1 and 20 parts by weight, and the amount of water-soluble compound is between 7 and 50 parts by weight in the pulverulent composition.

8. A pulverulent composition according to claim 1, wherein the weight ratio of the concentrations between the main surfactant and the water-soluble compound is between 20:80 and 90:10.

9. A pulverulent composition according to claim 3, wherein the weight ratio of the concentrations between the main surfactant and the water-soluble compound is between 20:80 and 90:10.

* * * * *